(No Model.)
A. C. ESTABROOK.
DEVICE FOR MAKING COVERED EYELETS.
No. 576,044.     Patented Jan. 26, 1897.
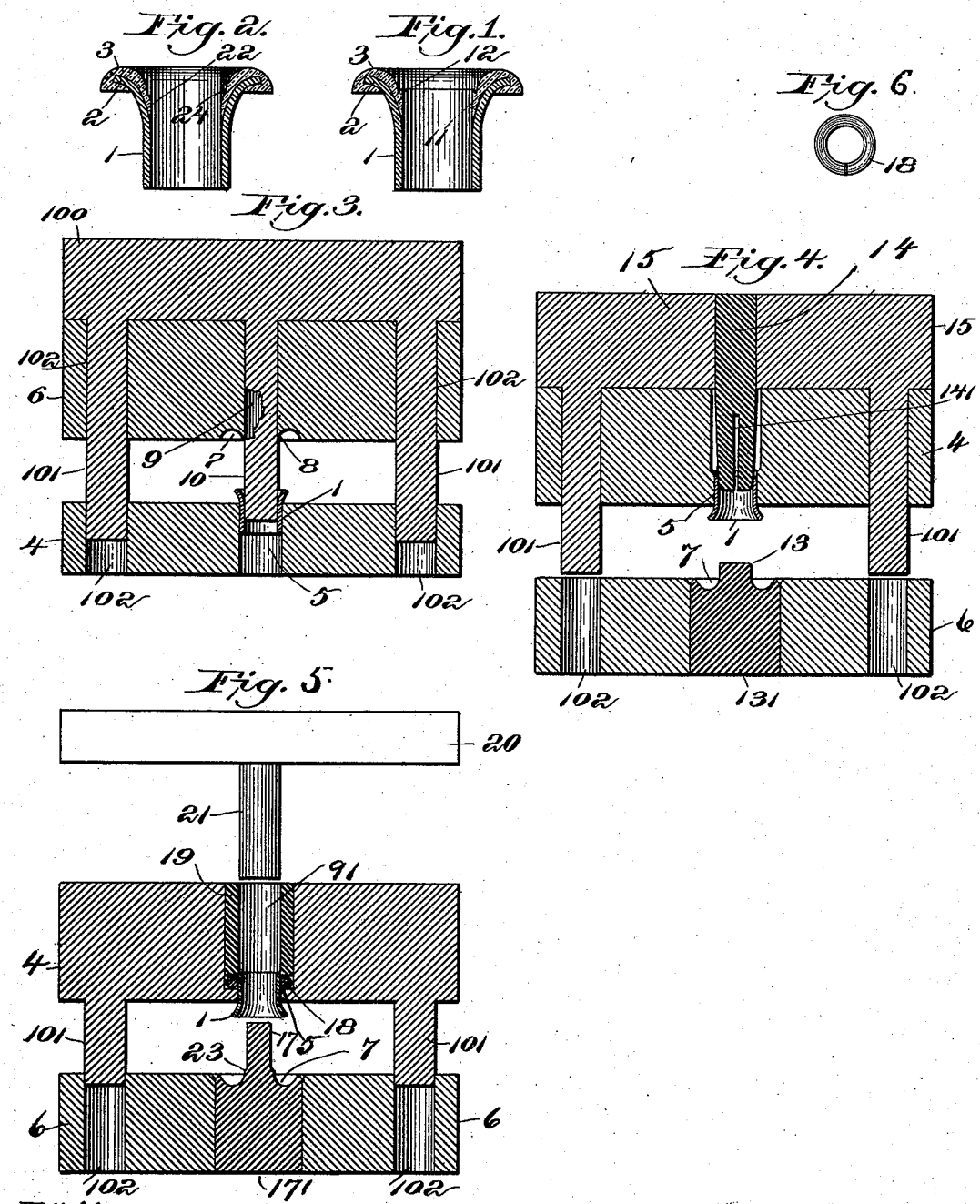
Witnesses:
Arthur L. Randall
Robert Wallace
Inventor:
Alanson C. Estabrook.
by Macleod Calver & Randall
Attorneys.

UNITED STATES PATENT OFFICE.

ALANSON C. ESTABROOK, OF NORTHAMPTON, MASSACHUSETTS.

DEVICE FOR MAKING COVERED EYELETS.

SPECIFICATION forming part of Letters Patent No. 576,044, dated January 26, 1897.

Application filed November 18, 1895. Serial No. 569,292. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Devices for Making Covered Eyelets, of which the following is a specification, reference being had therein to the accompanying drawings.

The invention consists in certain novel features of construction and in certain novel and useful combinations of parts, all of which will be fully described with reference to the accompanying drawings, and afterward will be more particularly pointed out and distinctly defined in the claims at the close of this specification.

Figure 1 of the accompanying drawings is a view showing the old form of covered eyelet, to which reference is made hereinafter, the same being represented in central vertical section. Fig. 2 is a corresponding view of another eyelet made by using the devices which are described hereinafter. Fig. 3 is a view in vertical section of molding devices, such as have been employed heretofore in the manufacture of eyelets like that which is represented in Fig. 1. Fig. 4 is a similar view showing a form of molding devices containing the immovable pin and split pin, which are referred to hereinafter as having been proposed heretofore. Fig. 5 is a view in similar section, showing my improved devices. Fig. 6 is a view in elevation of the eyelet-retaining device of Fig. 5.

1 in Figs. 1 and 2 is the metal body of an eyelet. 2 is the flange thereof, and 3 is the head or covering of plastic material, which is molded upon the said flange.

Heretofore in the manufacture of covered eyelets there has been employed for the purpose of molding heads or coverings 3, of plastic material, upon the flanged ends of the eyelets a pair of mold-plates or die-plates, such as those which are shown in Fig. 3, one of such plates—namely, that designated 4 in the said figure—being formed with a hole 5 for the reception of the body 1 of the eyelet, while the other plate—namely, that designated 6— is formed with a circular recess 7, corresponding in conformation with the head or covering 3 to be molded upon the eyelet. For the purpose of molding properly the inner portions of the said head or covering the portion 8 of the second mold-plate 6, which is located at the center of the said recess 7, is raised, and through a hole 9, perforating the center of this raised portion 8, is passed a pin 10, which pin, when the two mold-plates have been brought together in the operation of molding, passes into the throat or opening of the eyelet that is contained in the hole 5 of the plate 4. Pin 10 is carried by a plate 100. After the molding operation, and on the separation of the mold-plates 4 and 6, the eyelet remains upon the end of the said pin 10, it subsequently being doffed or stripped therefrom by retracting the said end of the pin into the hole 9 of the second mold-plate 6, thereby leaving the eyelet upon the surface of the said mold-plate 6, from which it is shaken or brushed into a suitable receptacle.

101 101 are steady-pins secured to plate 100 and passing through holes 102 102 in the other plates, so as to cause the parts to register properly with one another when they are put together.

Among the incidents to the use of the devices which have been described are the formation of an annular shoulder or well-defined ridge 11, Fig. 1, at the inner side of the head of the eyelet, and the formation of a bur or flash 12, Fig. 1, extending upwardly on the edge of this shoulder. These have not only marred the appearance of the eyelet, but have produced a roughness on the interior thereof which operates to wear and fray the lace which is passed through the eyelet after the latter is applied to a shoe. Thereby the value of the covered eyelet has been lessened considerably. The shoulder 11 is produced by the edge of the raised portion 8, while the bur or flash 12 is produced by the forcing of a portion of the elastic material into the small space which exists between the said edge and the surface of the pin 10.

In the endeavor to avoid the roughness produced by the bur or flash aforesaid it has been proposed to make the pin integral with the mold, as shown in Fig. 4, wherein the integral or fixed pin is marked 13, and forms part of a cylinder or plug 131, which is set in a hole in plate 6, one end of said cylinder or plug being shaped to constitute a mold, as shown. This prevents the existence of the space around the pin which heretofore has permitted the formation of the bur or flash. It also enables the mold and its pin, if desired, to be made without any projection or raised portion which will operate to produce the shoulder or ridge 11 shown in Fig 1. (See Fig. 4.) The use of an immovable pin necessitates the employment of special provisions for the removal or stripping of the eyelets from the molds after the completion of the molding operation. Thus, as shown in Fig. 4, the molding devices containing the integral or fixed pin 13 aforesaid have been provided, within the eyelet-receiving hole 5 of the plate 4, with an eyelet-retainer consisting of a pin 14, that is split, as at 141, at its inner end, so as to form elastic portions which are compressible toward each other. This pin 14 is secured to a plate 15, and is of a length which enables it to be projected into the hole 5 to an extent which permits the extremities of its split end to be reached by the metal body of the eyelet when the latter is placed in the said hole. As shown in Fig. 4, the body of the eyelet passes a short distance upon the said free extremity of the said split pin 14, and by the elasticity of the split portions the eyelet is held in place, the said portions expanding within the hole of the eyelet and pressing against the inner surface of the latter. After the molding operation, and on effecting the separation of the mold-plates, the eyelet-retainer pulls the eyelet off the pin 13 and holds it to the plate 4. In this way the removal of the eyelet from the said pin is readily effected. Subsequently the disengagement of the eyelet-retainer from the eyelet is effected by retracting the former. The said split pin projects into the eyelet-receiving hole 5 of the plate 4 just far enough to enable its extremity to enter the hole in the body of the eyelet. It cannot extend farther than this, for otherwise it would interfere with the entrance of the pin 13 into the said hole. Furthermore, the length of the pin 13 is limited by the use of this split pin, inasmuch as the said pin 13 must not be long enough to project into the hole of the eyelet far enough to strike against the end of the split pin. Should it strike said end, it would render it impossible to press the mold-plates together perfectly, and therefore the molding of the head or covering of the eyelet would be defective. Hence in practice, so far as I am aware, the immovable pin has been made only long enough to receive a washer of plastic material thereon. (See Fig. 4.) The limited length of the pin 13 of the mold-plate 6 renders it very inconvenient to apply to the end of the said pin the washers which are to be molded on the ends of the eyelets. It also renders them liable to become dislodged, particularly in case the mold-plate 6 should be inverted in applying it to the plate 4, as sometimes is the case.

In a prior application for Letters Patent of the United States, filed by me July 13, 1895, Serial No. 555,865, I have described a means and method of punching a washer from a sheet or strip of plastic material and depositing it at the same operation upon the movable pin, which is shown in Fig. 3 and has been referred to hereinabove. It is impossible to utilize the means and method just referred to in connection with the integral pin of Fig. 4, because the latter is too short to enable it to be utilized in punching, and because it also is impossible to retain the washers on such pin.

My present invention is in the nature of an improvement on the devices of Fig. 4. One object thereof is to permit the use of pins of a length which is sufficient to render them capable of being used in connection with the earlier invention that is set forth in my prior application aforesaid, and also capable of efficiently retaining in place the washers of plastic material which are to be molded onto the eyelets. Another object thereof is to provide an eyelet-retaining device more particularly fitted for use in connection with a mold having an immovable pin, but also useful in other connections as well, and which shall possess certain practical advantages that are set forth hereinafter. Other objects are disclosed in the course of the following description.

In the improved construction which is represented in Fig. 5, in lieu of the split pin 14 of Fig. 4, which fits within the body of the eyelet and in consequence necessitates the use of a short fixed pin 13, I employ a split ring 18, which latter is shown separately in Fig. 6. An advantage of the said split ring over the split pin 14 is the fact that whereas the latter passes into the interior of the eyelet the former passes exteriorly of the body of the eyelet and receives the latter into its own bore. This enables me to use a fixed pin 17, projecting to any desired extent from the surface of the mold 171. Whereas the short fixed pin 13 of Fig. 4 renders it impossible to utilize devices operating on the order of those of my prior application to make and apply the washers thereto, and also tends to the dislodgment of the washers therefrom after having once been applied thereto, the fixed pin 17 of Fig. 5 may be made of any necessary length, and it is shown in such figure as of sufficient proportions not only to enable the washers to be formed upon and applied to said pin 17, but of such length as effectually to guard against the dislodgment of the said washer. For the reception of the said split ring the plate 4 is counterbored around the hole 5 to a point sufficiently close to the lower surface of the said plate (see Fig. 5) to enable the split ring 18, when placed within the counterbore or chamber thus formed, to engage with the exterior of the body of an eyelet which is inserted into the hole 5. The said ring permits the said body to pass into it and clasps the exterior of the said body. The ring 18 is held in place at the lower end of the chamber by a tube 19, which is driven into the chamber. For the purpose of doffing or stripping the eyelets from the plate 4 I employ, by preference, the plate shown at 20 in Fig. 5, it being provided with a pin 21, which is passed into the hole 91 of tube 19 from above and forces out at the lower end of the said hole the eyelet which has been retained therein by the split ring.

The invention which is represented in Figs. 5 and 6 possesses several advantages over the construction which is represented in Fig. 4. One of these advantages results from the fact that the construction first mentioned omits the plate 15, which is shown in Fig. 4. As is well understood by those skilled in the art of molding plastic substances, the various mold-plates are required to be heated in order to render sufficiently plastic the material or compound that is used. Two plates, such as 15 and 4 in Fig. 4, one resting against the other, will not heat or cool as rapidly as a single plate will, owing to the presence of a thin stratum of air between them. Hence the use of the plates 15 in the construction that is shown in Fig. 4 occasions more or less delay in the heating and cooling of the mold-plates. The value of the time which is consumed in the said heating and cooling enters largely into the matter of fixing the cost of manufacture. In the case of the construction which is shown in Figs. 5 and 6, there being no plate 15, the mold-plates heat and cool with increased rapidity, thus enabling the said mold-plates to be employed in a considerably greater number of molding operations between given time limits, thereby increasing the output which can be secured with a given plant and diminishing the cost of the articles produced.

Another advantage of the construction which is represented in Figs. 5 and 6 is the following: With the construction which is shown in Fig. 4 after the performance of the molding operation and the separation of the mold-plates the eyelet-retaining device 14 has to be retracted from engagement with the body of the eyelet. It is intended that when the said retaining device 14 has thus been retracted the eyelet shall dislodge itself from the hole 5 of the plate 4 through gravity or admit of being shaken or jarred therefrom. Sometimes in practice, however, the eyelet sticks in the hole 5, and this necessitates a second operation, namely, moving the retaining device 14 back again into its former position, so as to push the stuck eyelet out. In the case of the construction which is shown in Figs. 5 and 6 the dislodgment of the eyelets may be effected by a single operation, namely, the introduction of the pins 21 into the holes 5, which forces the eyelets out.

It will be understood, of course, that although in the various figures of the drawings I have shown the devices as constructed to mold the head upon a single eyelet in practice the molding devices are constructed to operate upon a larger number of eyelets at a time.

For the purpose of producing when desired a skirt or lining 22, of plastic material, Fig. 2, within the eyelet I may reduce somewhat the diameter of the pin 17, as indicated in Fig. 5, so as to leave a slight space between it and the interior of the body of the eyelet after the eyelet has been placed in the hole 5 and the two mold-plates of a set have been brought together. When the mold-plates are subjected to compression, the plastic material flows into this interior space and passes lengthwise of the pin to the distance provided for. In order that when the pin has been reduced in thickness the material shall not flow too readily in the direction of the length of the pin, which would result in a decreased and insufficient compression of the material composing the head proper, and thereby result in defective coverings or heads, I may provide or form the slight round shoulder or ridge at 23. This serves as a kind of dam to check the too-free flow of the plastic material at the time of the compression. It therefore insures the presence in the groove 7 of a sufficient amount of material to provide for proper compression and perfect formation of the head. This shoulder 23 produces a slight annular indentation or depression 24, Fig. 2, at the inner side of the head of the eyelet, which marks the junction of the skirt or lining 22 with the head. As will be observed in Fig. 2, the head and skirt or lining are free from all roughness or objectionable projection and afford a smooth unbroken surface. The skirt or lining conceals all such portions of the metal surface at the interior of the eyelet as would be visible from above after the application of the eyelet to a shoe.

I claim as my invention—

1. In combination, a mold having an eyelet-receiving hole, and an eyelet-retainer applied to said mold and consisting of a split ring into which the body of the eyelet may pass, the said ring clasping the exterior of the said body, substantially as set forth.

2. In combination, a mold having an eyelet-receiving hole, an eyelet-retainer consisting of a split ring into which the body of the eyelet may pass, the said ring clasping the exterior of the said body, and the ejecting-pin 21, substantially as set forth.

In testimony whereof I affix my signature in presence of two witnesses.

ALANSON C. ESTABROOK.

Witnesses:
FRANK N. LOAK,
JANET L. ELLIOT.